US010260478B2

(12) United States Patent
Christoffersen

(10) Patent No.: US 10,260,478 B2
(45) Date of Patent: Apr. 16, 2019

(54) WIND TURBINE COMPRISING A SERVICE FLOOR

(71) Applicant: Vestas Wind Systems A/S, Aarhus N. (DK)

(72) Inventor: Leif Christoffersen, Vejle (DK)

(73) Assignee: Vestas Wind Systems A/S, Aarhus N. (DK)

( * ) Notice: Subject to any disclaimer, the term of this patent is extended or adjusted under 35 U.S.C. 154(b) by 271 days.

(21) Appl. No.: 14/437,129

(22) PCT Filed: Oct. 18, 2013

(86) PCT No.: PCT/DK2013/050335
§ 371 (c)(1),
(2) Date: Apr. 20, 2015

(87) PCT Pub. No.: WO2014/059996
PCT Pub. Date: Apr. 24, 2014

(65) Prior Publication Data
US 2015/0285218 A1    Oct. 8, 2015

Related U.S. Application Data

(60) Provisional application No. 61/719,601, filed on Oct. 29, 2012.

(30) Foreign Application Priority Data

Oct. 19, 2012    (DK) .................................. 2012 00643
Feb. 28, 2013    (GB) ................................... 1303608.2

(51) Int. Cl.
*F03D 1/06*      (2006.01)
*F03D 80/50*     (2016.01)

(52) U.S. Cl.
CPC ........... *F03D 1/0691* (2013.01); *F03D 1/065* (2013.01); *F03D 80/50* (2016.05);
(Continued)

(58) Field of Classification Search
CPC .......... F01D 1/003; F01D 1/065; F01D 1/091; F01D 3/003; F01D 3/065; F01D 3/091; F03D 80/50; F05B 2240/14
See application file for complete search history.

(56) References Cited

U.S. PATENT DOCUMENTS 9,115,698 B2 *   8/2015  Segovia ................. F03D 80/50
2009/0060748 A1 *  3/2009  Landa ..................... F03D 80/60
                                                   416/93 R
(Continued)

FOREIGN PATENT DOCUMENTS

EP    1944508 A2    7/2008
EP    2034181 A2    3/2009
(Continued)

OTHER PUBLICATIONS

Translation of ES 2,359,310 A1, EPO, retrieved Jul. 10, 2017.*
(Continued)

*Primary Examiner* — Carlos A Rivera
*Assistant Examiner* — Jesse M Prager
(74) *Attorney, Agent, or Firm* — Wood Herron & Evans LLP

(57) ABSTRACT

The present invention provides a horizontal axis wind turbine comprising a tower, a nacelle mounted on top of the tower, and a rotor rotationally mounted to the nacelle. The rotor comprises a hub carrying a plurality of blades. Furthermore, the rotor comprises a spinner covering the hub and defining a space between the spinner and the hub. The spinner and hub are sized such that the space allows service personnel to work within the space. A service floor for
(Continued)

supporting the service personnel is provided in the space. The service floor provides a substantially plane support structure.

12 Claims, 5 Drawing Sheets

(52) U.S. Cl.
CPC ......... *F05B 2240/14* (2013.01); *Y02E 10/721* (2013.01); *Y02E 10/726* (2013.01)

(56) References Cited

U.S. PATENT DOCUMENTS

| | | | |
|---|---|---|---|
| 2010/0232978 A1* | 9/2010 | Nielsen | F03D 1/003 |
| | | | 416/248 |
| 2011/0241353 A1 | 10/2011 | Numajiri | |
| 2012/0134840 A1* | 5/2012 | Leland | F03D 1/0691 |
| | | | 416/244 R |
| 2012/0201693 A1* | 8/2012 | Pettersson | F03D 1/0658 |
| | | | 416/244 R |

FOREIGN PATENT DOCUMENTS

| | | |
|---|---|---|
| EP | 2192297 A2 | 6/2010 |
| EP | 2484893 A2 | 8/2012 |
| EP | 2662559 A1 | 11/2013 |
| ES | 2359310 A1 * | 5/2011 |

OTHER PUBLICATIONS

International Searching Authority, International Search Report issued in corresponding Application No. PCT/DK2013/050335, dated Feb. 20, 2014, 10 pages.

Danish Patent and Trademark Office, Search report issued in corresponding Application No. PA 2012 00643, 4 pages.

Intellectual Property Office, Search report issued in corresponding Application No. GB1303608.2, 5 pages, dated Jul. 16, 2013.

European Patent Office, European Search Report in EP Application No. 16185407, dated Jan. 4, 2017.

The International Bureau of WIPO, International Preliminary Report on Patentability issued in International Application No. PCT/DK2013/050335 dated Apr. 21, 2015.

* cited by examiner

WIND TURBINE COMPRISING A SERVICE FLOOR

FIELD OF THE INVENTION

The present invention relates to a horizontal axis wind turbine comprising a tower, a nacelle mounted on top of the tower, and a rotor rotationally mounted to the nacelle. The rotor comprises a hub carrying a plurality of blades, each blade being attached to the hub via a blade flange, and the rotor further comprising a spinner covering the hub.

BACKGROUND OF THE INVENTION

Traditionally, a spinner covering a hub is provided to create an aerodynamic surface around the hub and the blade roots, and to protect the hub, the blade root, and the flanges from the weather.

During the lifetime of a wind turbine, service operations have to be undertaken at regular time intervals. Many of the service operations requires service personnel to access the hub, which often on modern wind turbines is a hollow cast iron structure. Some service actions may require access between the hub and the spinner. Such access can be difficult and uncomfortable to the personnel, who may have to climb or crawl in narrow spaces when performing different actions.

DESCRIPTION OF THE INVENTION

It is an object of embodiments of the invention to provide improved working conditions for service personnel working on wind turbines.

It is a further object of embodiments of the invention to provide improved access for service personnel at areas on or at the hub exterior or interior.

According to a first aspect, the invention provides a horizontal axis wind turbine comprising a tower, a nacelle mounted on top of the tower, and a rotor rotationally mounted to the nacelle, the rotor comprising a hub carrying a plurality of blades, and further comprising a spinner covering the hub and defining a space between the spinner and the hub, characterised in that the spinner and hub are sized such that the space allows service personnel to work within the space, and in that a service floor for supporting the service personnel is provided in the space, the service floor providing a substantially plane support structure.

In the present context the term 'horizontal axis wind turbine' should be interpreted to mean an apparatus which is capable of transforming energy of the wind into electrical energy, preferably to be supplied to a power grid. A plurality of wind turbine blades extracts the energy from the wind, thereby causing a rotor to rotate. The rotational movements of the rotor are transferred to a generator, either directly via a stator part and a rotor part, or via a drive train, e.g. including a main shaft, a gear system and an input shaft for the generator.

The rotor comprises a plurality of wind turbine blade attached to a hub. The hub rotates when the wind turbine blades extract energy from the wind. In the case that the wind turbine is of a kind comprising a drive train for transferring the rotational movements of the rotor to the generator, the hub may advantageously be connected to a main shaft in such a manner that rotational movements of the hub are transferred to rotational movements of the main shaft. In the hub of the present invention, the main shaft may be connected to the hub via a main shaft flange on the hub and a corresponding flange on the main shaft. Similarly, the blades may be connected to the hub via blade flanges and a corresponding flange on the wind turbine blade, preferably via a pitch bearing.

The rotor is rotatably connected to a nacelle about an axis of rotation. The nacelle may house components and systems necessary for converting mechanical energy into electricity. The component may range from heavy duty generators, gearboxes, brakes, and transformers to small electronic components.

The spinner and the hub are sized to allow service personnel to work within the space, so that the service personnel at least at some areas within the space can work without having to crawl or be in an uncomfortable posture. Herein it is e.g. considered sized to allow work within the space, if the space has a height of at least 75 centimeters within an area of not less than 0.55 meters×0.55 meters, i.e. approximately 0.3 m$^2$. It may be an advantage to allow service personnel to stand straight at least in certain areas, thereby providing a space having a height of at least 1.75 meters, such as a height of at least 1.9 meters or even higher in these areas.

To facilitate work in the space, a service floor for supporting the personnel is provided. By support is herein meant, that the service floor forms a floor for the personnel, which floor is near horizontal or horizontal so that a person can stand on the floor. To minimize the risk of stumbling, and to improve the working conditions, the service floor provides a substantially plane structure. The substantially plane structure may thus be at an angle in the range of 0-20 degrees, such as 7-15 degrees relative to horizontal.

By this invention, the spinner obtains an additional function, i.e. it provides aerodynamic characteristics of the hub and protects the hub, and additionally it forms a service space with a service floor which supports service personnel in the space. Accordingly, the invention provides a new feature by use of an existing feature and thereby supports servicing of the wind turbine without increasing complexity and weight of the hub.

The spinner and the hub may be sized so that the service personnel can stand straight at least at some positions of the service floor, thereby providing a significant improvement of the working conditions for the service personnel compared with the working conditions of traditional wind turbines.

It should be understood, that the term service personnel covers any persons who have to work within the space, independent of whether they are carrying out service work, maintenance, repair, installation, etc.

In one embodiment, the service floor provides support, when the rotor is parked so that a blade is pointing downwards. By providing the turbine with a number of service floors, the number being equal to the number of blades, a service floor may be provided when the rotor is parked with anyone of the blades pointing downwards.

Each blade may be attached to the hub via a blade flange, and the plane support structure may be parallel to a blade flange. Parking the rotor with one of the blades pointing downwards may facilitate working in the space, as the plane support structure of the service floor may consequently be positioned so that it provides good support for the service personnel. To avoid that the blades touches the tower when the rotor rotate, the blade bearing may not be horizontal, when the rotor is parked so that a blade is pointing downwards. Consequently, the plane support structure may in this position be at an angle in the range of 5-20 degree relative to a horizontal plane, so that the lowest position of the plane support structure is closest to the nacelle and the tower.

When carrying out work within the space, the service personnel may stand and work directly at an inner surface of the spinner, whereby the service floor may form part of the spinner. To protect the inner surface of the spinner which may be formed of a fibre material, such as glass fibres, the inner surface may be covered by e.g. a metal lining or the like.

As an alternative, the service floor may form part of the hub. As the hub may be casted from a castable material, such as cast iron, the service floor may be casted together with the hub in an integral casting procedure.

As a further alternative, the service floor may be a separate component attached to at least one of the spinner and the hub. At least one of the hub and the spinner may comprise at least one attachment element adapted for engagement with a concurrent structure at the service floor, e.g. a bolt and nut connection. This may be facilitated by providing the hub or the spinner with local increased thickness at selected positions, where the at least one attachment element is located.

Thus, the service floor may form part of, or may be attached to at least one of the spinner and hub.

If the service floor does not from part of the spinner, the service floor may be formed as separate component e.g. made from sheet material of a thickness providing sufficient strength to support the service personnel, e.g. of a steel plate. The floor may be perforated in order to decrease the weight hereof, or may be form as a grid.

The wind turbine may comprise, for each blade which is carried by the hub, a substantially plane support structure being parallel to a blade flange, whereby a plurality of plane support structures may be provided. Consequently, a plurality of service floors may also be provided. As the number of service floors may equal the number of blades, a different service floor may support the service personnel whenever the rotor is parked with a different blade pointing downwards.

The service floor may at least partly surround a blade flange, thereby facilitating service personnel working at a large area within the space. When the rotor is parked so that one of the blades in pointing downwards it may be possible for service personnel to move substantially unhindered from a position behind the blade, i.e. a position close to the nacelle, to a position in front of the blade, i.e. a position closer to the front of the spinner. When moving from one position to another, the service personnel may have to bend over at certain areas of the space, e.g. when having to pass one of the blades.

As described above, the wind turbine may comprise a service floor and thus a substantial plane support structure for each of the blades attached to the hub. The plane support structures may form part of the spinner. In that case, the spinner forms a shell structure which, e.g. in one piece, is formed by the plane support structures and intermediate portions extending between the plane support structures. If the wind turbine comprises three blades, the spinner may e.g. have a tetrahedron-like shape with four triangular faces which are joined. One of the four triangular faces is towards the nacelle, and the main shaft extends from that face. The other three triangular faces are each facing in the direction of a corresponding one of the blades, i.e. the blades extend from the hub through one of the triangular faces towards the tip. The three triangular faces each define a service floor, and they are joined with the other two faces by curved intermediate portions.

To facilitate entrance into the space from the nacelle, the nacelle may comprise a nacelle end wall facing the spinner, and the spinner may comprise a spinner end wall facing the nacelle. Furthermore, the nacelle end wall may comprise at least two nacelle openings, and the spinner end wall may comprise at least two spinner openings, so that, when the rotor is parked with anyone of the blades pointing downwards, a nacelle opening may each be aligned with a spinner opening, to provide two simultaneously appearing passages from the nacelle into the spinner.

Thus, each passage may be formed by a nacelle opening and a matching spinner opening. The openings may be of a size which allows personnel to reasonably freely pass the openings. Furthermore, the size of at least some of the openings may be large enough for the personnel to bring tools, spare parts, or other items when passing the openings.

By "aligned" is herein meant, that a nacelle opening is at least partly overlapping a spinner opening when viewed in parallel with the rotor axis.

The distance between the nacelle end wall and the spinner end wall may be in the range of 30-150 millimeters, such as in the range of 50-90 millimeters, thereby ensure that personnel who has to enter the space from the nacelle are not exposed to the risk of falling down between the nacelle and the spinner.

As parking of the rotor so that one of the blades is pointing downwards may provide two simultaneously appearing passages from the nacelle into the space, these passages may further provide an escape passage of out of the space if the passage used for entrance into the space for some reasons becomes blocked or if access hereto becomes difficult.

The passages may be provided on opposite sides of the hub, i.e. on opposite sides of the rotor axis thereby providing a larger distance from one passage to the other. This may be particularly relevant in case of fire at an area close to a first one of the passages, as the likelihood that the second passage may also be block by fire may decrease with an increasing distance to the first passage.

To improve the working conditions, the service floor may extend from one of the passages to the other one of the passages, thereby providing the possibility of support for the service personnel at a larger area of the space.

Parking of the rotor so that a blade is substantially horizontally positioned may facilitate maintenance and/or repair work at an interface between a blade and the hub/spinner. Thus, in one embodiment, the service floor provides support, when the rotor is parked so that a blade is substantially horizontally positioned. By providing the turbine with a number of service floors, the number being equal to the number of blades, a service floor may be provided when the rotor is parked with anyone of the blades being substantially horizontally positioned.

The wind turbine may further comprise an outer service floor provided at an outer surface of the spinner, when the rotor is parked with anyone of the blades pointing upwards. Thus, service personnel may work at an outer surface of the spinner e.g. when carrying out maintenance work on a blade bearing. Access may be provided via an opening in an upper part of the nacelle end wall or the ceiling of the nacelle, from where the personnel may walk onto the outer surface of the spinner. Due to the above discussed small distance between the nacelle and the spinner, the personnel may be hindered in falling down between the spinner and the hub.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
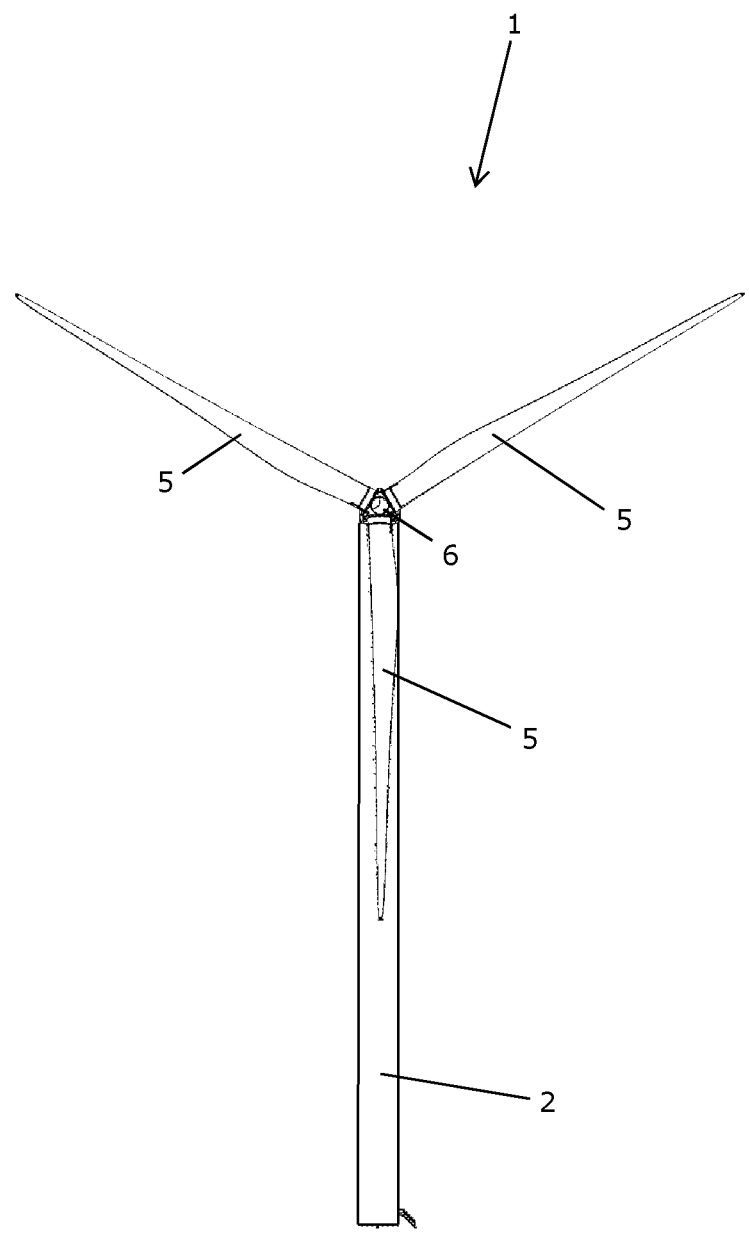
FIG. 1 illustrates a front view of a horizontal axis wind turbine with a blade pointing downwards.

FIG. 1 illustrates a front view of a horizontal axis wind turbine 1 comprising a tower 2, a nacelle 3 (see FIG. 2a) mounted on top of the tower 2, and a rotor rotationally mounted to the nacelle 3. The rotor comprises a hub 4 (see FIG. 2b) carrying three blades 5, of which one is pointing downwards. The hub 4 further comprises a spinner 6 covering the hub 4 and defining a space 7 (see FIG. 2b) between the spinner 6 and the hub 4.

Figure 2A:
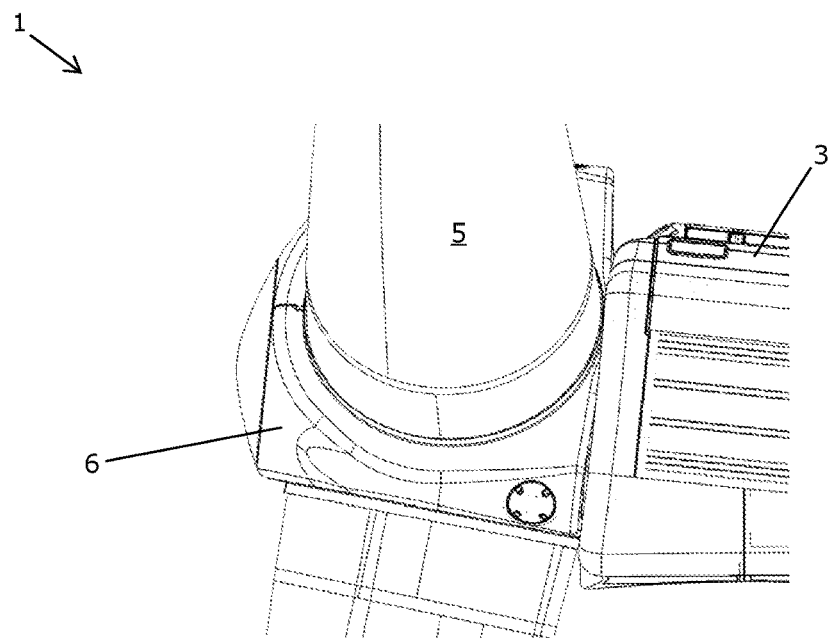
FIGS. 2a and 2b illustrate a side view of the wind turbine of FIG. 1, FIGS. 3a and 3b illustrate a side view of an alternative embodiment of a horizontal axis wind turbine with a blade pointing downwards.
Figure 2B:
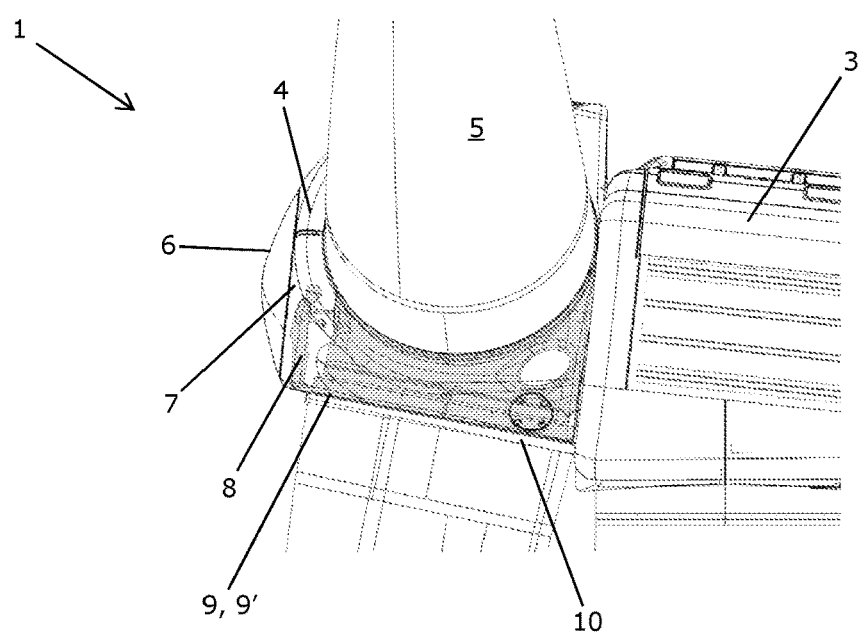

FIGS. 2a and 2b illustrate a side view of the wind turbine 1 of FIG. 1. FIG. 2a illustrates the spinner 6 from the outside, whereas FIG. 2b provides a view through the spinner 6 to the hub 4 covered by the spinner 6. The spinner 6 and hub 4 are sized such that the space 7 allows service personnel 8 to work within the space 7. A service floor 9 for supporting the service personnel 8 is provided in the space. The service floor 9 providing a substantially plane support structure 9'.

The spinner 6 and the hub 4 are sized so that the service personnel 8 can stand straight at least at some positions of the service floor 9, thereby providing a significant improvement of the working conditions for the service personnel 8 compared with the working conditions of traditional wind turbines.

Each blade 5 is attached to the hub 4 via a blade flange 10, and the plane support structure 9' is parallel to such a blade flange 10. Parking the rotor with one of the blades 5 pointing downwards facilitates working in the space, as the plane support structure 9' in this position is at an angle in the range of 0-20 degree relative to a horizontal plane.

When carrying out work within the space 7, the service personnel 8 can stand and work directly at an inner surface of the spinner, whereby the service floor 9 forms part of the spinner 6, as illustrated in FIG. 2b. To protect the inner surface of the spinner 6, the inner surface may be covered by e.g. a metal lining or the like.

Figure 3A:
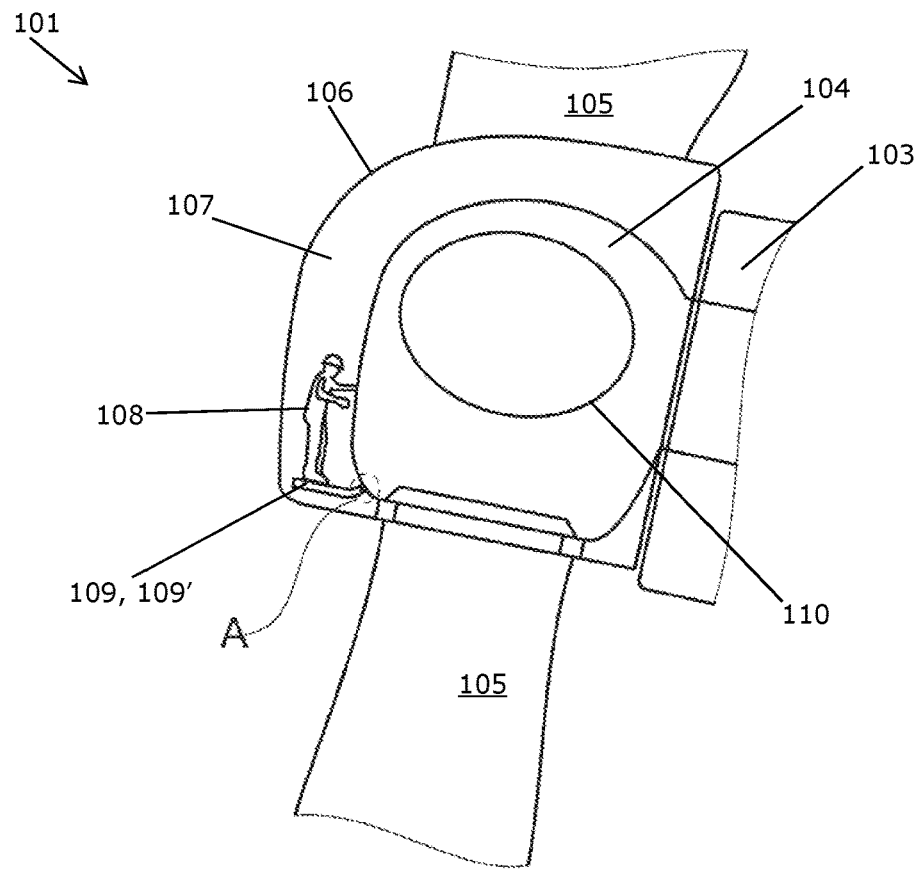
Figure 3B:
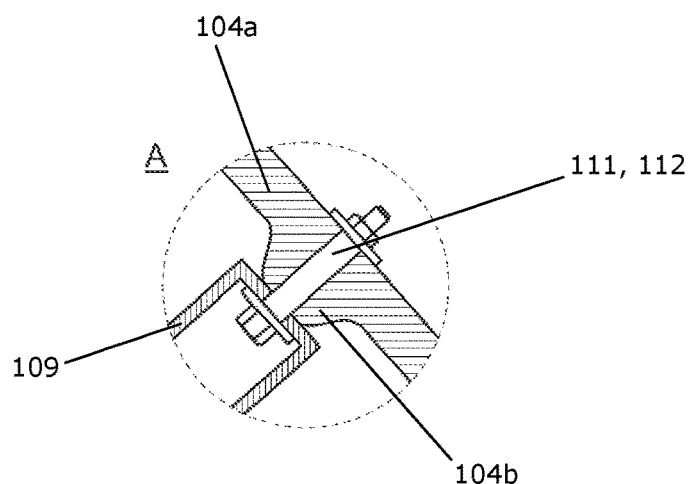

FIGS. 3a and 3b illustrate a side view of an alternative embodiment of a horizontal axis wind turbine 101. This embodiment is similar to the one illustrated in FIGS. 2a and 2b except for the service floor 109 which in this embodiment does not form part of the spinner 107. In the wind turbine 101 of FIGS. 3a and 3b, the service floor 109 is attached to the hub 104. The hub 104 comprises a plurality of attachment elements 111, here openings for bolts, the attachment elements being adapted for engagement with a concurrent structure 112 at the service floor 109, here bolt and nut assemblies. Furthermore, the hub wall 104a is provided with local increased thickness 4b at selected positions, where the at least one attachment element 111 is located. Only two of the three blades 105 are illustrated, as one of the blades has been removed for illustration purposes. Consequently, the blade flange 110 of this blade can be seen.

Figure 4A:
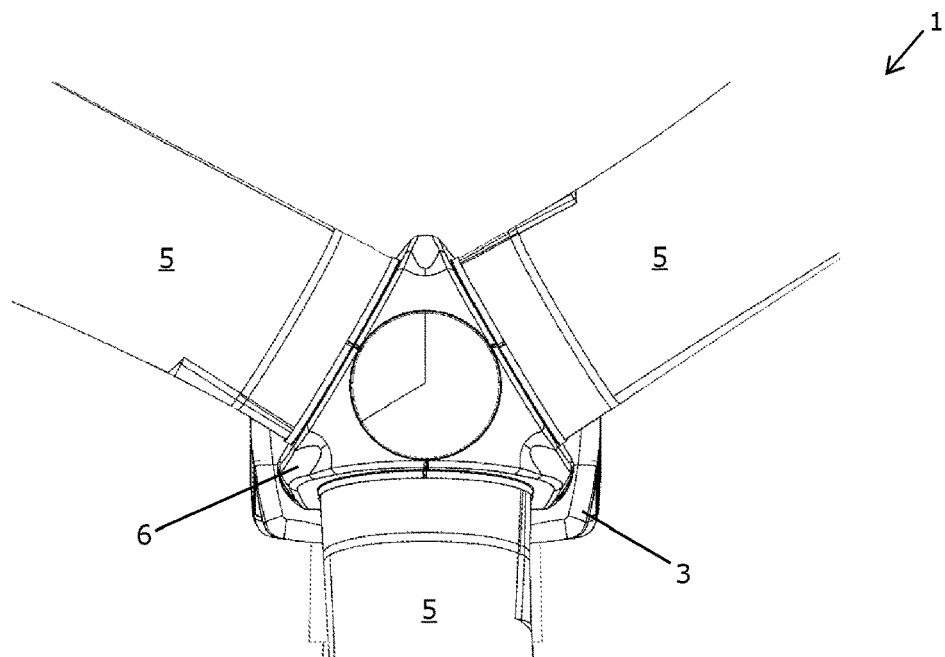
FIGS. 4a and 4b illustrate a front view of a horizontal axis wind turbine with a blade pointing downwards.
Figure 4B:
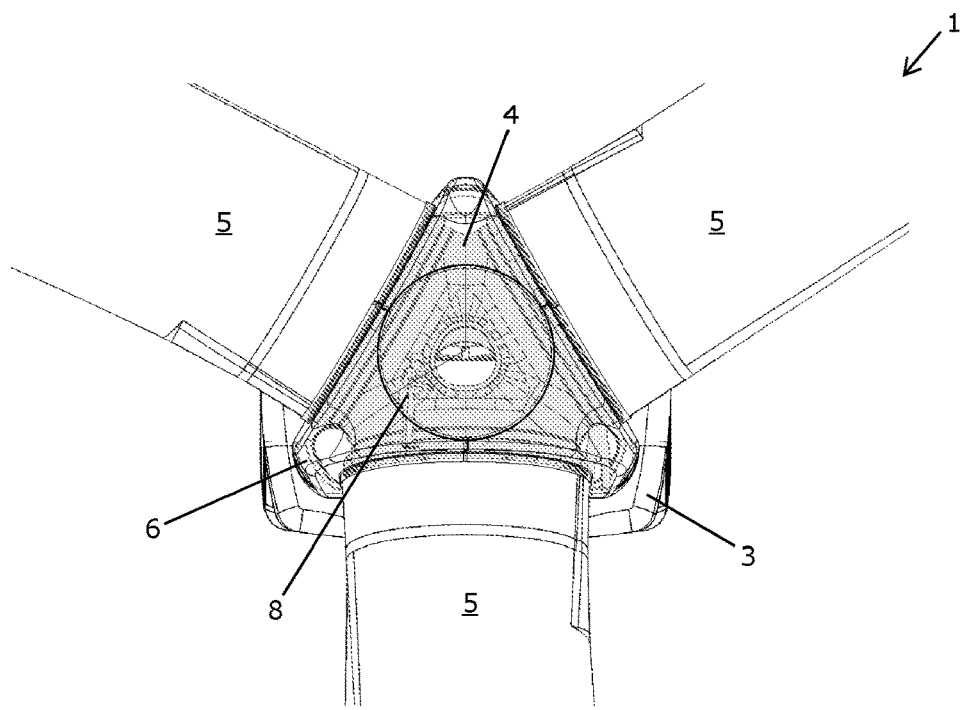

FIGS. 4a and 4b illustrate a front view of the horizontal axis wind turbine 1 of FIG. 1. FIG. 4a illustrates the spinner 6 from the outside, whereas FIG. 4b provides a view through the spinner 6 to the hub 4 covered by the spinner 6 thereby providing a view to the service personnel 8 working in the space 7.

Figure 5:
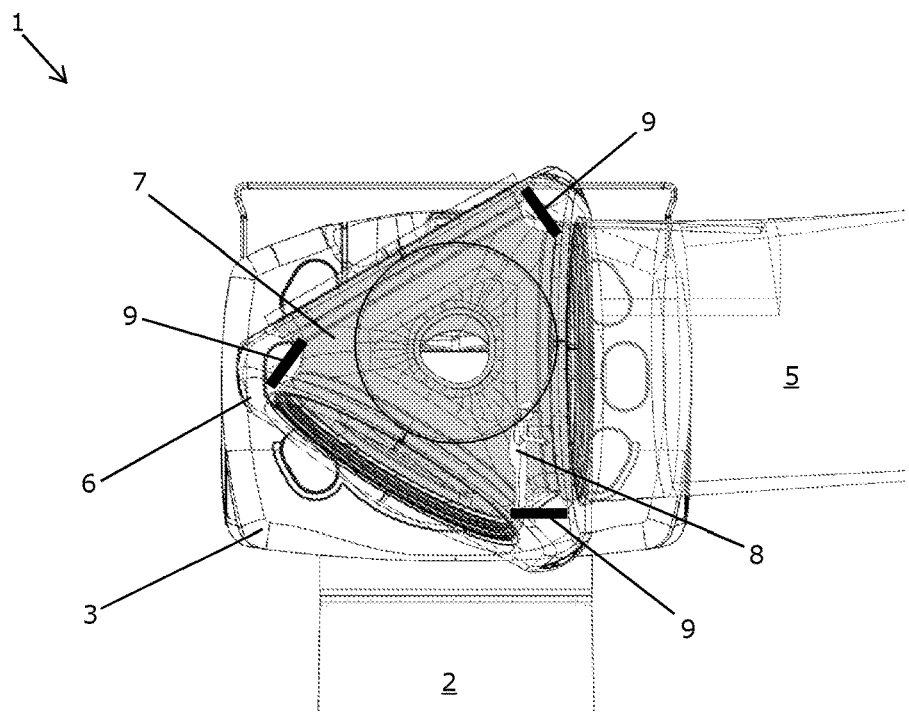
FIG. 5 illustrates a front view of a horizontal axis wind turbine parked with a blade in a substantially horizontal position.

FIG. 5 illustrates a front view of a horizontal axis wind turbine 1 which is parked with one of the blades 5 in a substantially horizontal position. The two other blades are not illustrated. Parking of the rotor so that one of the blades 5 is substantially horizontally positioned, the service personnel 8 may maintain and/or carry out repair work at an interface between a blade 5 and the hub 4, here at the blade flange 10. The wind turbine 1 is provided with three service floors 9, the number being equal to the number of blades 5, whereby a service floor 9 is provided when the rotor is parked with anyone of the blades 5 being substantially horizontally positioned.

Figure 6:
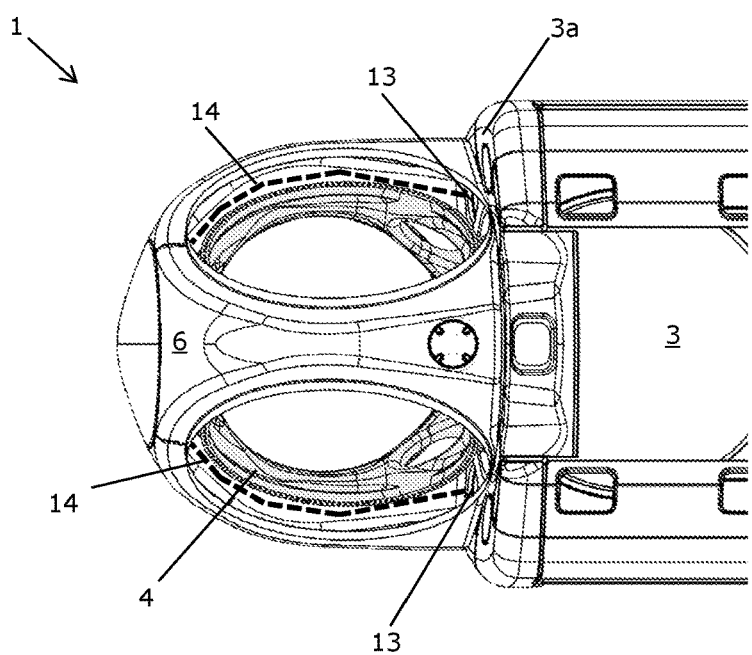
FIG. 6 illustrates top view of a horizontal axis wind turbine with a blade pointing downwards.

FIG. 6 illustrates a top view of a horizontal axis wind turbine 1 being parked with one of the blades pointing downwards. The two other blades pointing partly upwards and partly outwards have been removed to provide a view to the space 7.

To facilitate entrance into the space 7 from the nacelle 3, the nacelle 3 comprises a nacelle end wall 3a facing the spinner 6, and the spinner 6 comprise a spinner end wall facing the nacelle. Furthermore, the nacelle end wall 3a comprises at least two nacelle openings (not shown), and the spinner end wall comprise at least two spinner openings (not shown), so that, when the rotor is parked with anyone of the blades 5 pointing downwards, two nacelle opening are each aligned with a spinner opening, to provide two simultaneously appearing passages 13 from the nacelle 3 into the spinner 6.

The distance between the nacelle end wall 3a and the spinner end wall is in the range of 50-90 millimeters, thereby ensuring that service personnel who has to enter the space 7 from the nacelle 3 are not exposed to the risk of falling down between the nacelle 3 and the spinner 6.

The passages 13 are in the illustrated embodiment provided on opposite sides of the hub 4, i.e. on opposite sides of the rotor axis. To improve the working conditions, the service floor 9 extends from one of the passages 13 to the other one of the passages 13, thereby providing the possibility of support for the service personnel 8 at a larger area of the space. Service personnel 8 thereby have the possibility of working at a larger area, i.e. from one passage 13 to the other passage 13 along the dotted line 14.

The invention claimed is:

1. A horizontal axis wind turbine, comprising:
   a tower,
   a nacelle mounted on top of the tower, and
   a rotor rotationally mounted to the nacelle, the rotor comprising:
      a hub carrying a plurality of blades, wherein each blade is attached to the hub via a blade flange, and wherein the intersection of each of the plurality of blades with the hub defines a hub-blade interface,
      a spinner covering the hub and at least a portion of the root section of the plurality of blades such that the hub-blade interface is accessible from within an interior of the spinner, the spinner defining a space between the spinner and the hub, wherein the spinner and hub are sized such that the space allows service personnel to work within the space, and a service floor for supporting the service personnel provided in the space, the service floor including a plane support structure for each blade which is carried by the hub, each plane support structure being parallel to the blade flange of a respective one of the plurality of blades, wherein the spinner is formed by an outer shell structure, the outer shell structure being formed by the plurality of plane support structures and a plurality of intermediate portions extending between the plane support structures.

2. The horizontal axis wind turbine according to claim 1, wherein the service personnel can stand straight at least at some positions of the service floor.

3. The horizontal axis wind turbine according to claim 1, wherein the service floor at least partly surrounds the blade flange of at least one of the plurality of blades.

4. The horizontal axis wind turbine according to claim 1, wherein the nacelle comprises a nacelle end wall facing the spinner, and the spinner comprises a spinner end wall facing the nacelle, and wherein the nacelle end wall comprises two nacelle openings, and the spinner end wall comprises at least two spinner openings, wherein, when the rotor is parked with anyone of the blades pointing downwards, the nacelle openings are each aligned with one of the spinner openings, so as to provide two simultaneously appearing passages from the nacelle into the spinner.

5. The horizontal axis wind turbine according to claim 4, wherein the passages are provided on opposite sides of the hub.

6. The horizontal axis wind turbine according to claim 4, wherein the service floor extends from one of the passages to the other one of the passages.

7. The horizontal axis wind turbine according to claim 1, wherein the service floor provides support, when the rotor is parked so that a blade is pointing downwards.

8. The horizontal axis wind turbine according to claim 1, wherein the service floor provides support when the rotor is parked so that one of the plurality of blades is horizontally positioned.

9. The horizontal axis wind turbine according to claim 1, wherein the spinner and the hub are sized to allow the service personnel to stand straight at least on certain areas, thereby providing a space having a height of at least 1.75 meters.

10. The horizontal axis wind turbine according to claim 1, wherein the plurality of blades includes three blades, and wherein the spinner has a tetrahedron shape with four triangular faces which are joined.

11. The horizontal axis wind turbine according to claim 10, wherein one of the triangular faces is toward the nacelle wherein a main shaft connected to the hub extends from that face, and wherein the other three triangular faces are each facing in the direction of a corresponding one of the blades.

12. The horizontal axis wind turbine according to claim 5, wherein each passage is formed by a nacelle opening and a matching spinner opening.

\* \* \* \* \*